United States Patent
Hosein et al.

(10) Patent No.: US 7,554,954 B2
(45) Date of Patent: **\*Jun. 30, 2009**

(54) PER USER RATE CONTROL FOR THE REVERSE LINK IN CDMA NETWORKS

(75) Inventors: Patrick A. Hosein, San Diego, CA (US); Tao Wu, Carlsbad, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1109 days.

This patent is subject to a terminal disclaimer.

(21) Appl. No.: 10/731,909

(22) Filed: Dec. 10, 2003

(65) Prior Publication Data

US 2005/0141461 A1 Jun. 30, 2005

Related U.S. Application Data

(60) Provisional application No. 60/494,661, filed on Aug. 12, 2003.

(51) Int. Cl.
*H04B 7/216* (2006.01)
*H04W 72/00* (2009.01)

(52) U.S. Cl. .................. 370/335; 370/329; 455/452.1; 455/561

(58) Field of Classification Search .......... 370/335, 370/342, 441, 328, 329; 455/450, 452.1, 455/453, 561
See application file for complete search history.

(56) References Cited

U.S. PATENT DOCUMENTS

| | | | |
|---|---|---|---|
| 5,887,245 A | | 3/1999 | Lindroth |
| 6,035,210 A | * | 3/2000 | Endo et al. ................ 455/522 |
| 6,069,883 A | * | 5/2000 | Ejzak et al. ................ 370/335 |
| 6,324,172 B1 | | 11/2001 | Pankaj |

(Continued)

FOREIGN PATENT DOCUMENTS

EP 0 767 548 4/1997

(Continued)

OTHER PUBLICATIONS

Avinash Jain; Full Buffer Performance of 5ms, 4 transmission and 10ms, 3 transmission with distributed scheduling using geometry based-priority function; Aug. 12, 2003; C30-20030812-061-QCOM; 4 pgs.

(Continued)

*Primary Examiner*—Quochien B Vuong
(74) *Attorney, Agent, or Firm*—Coats & Bennett, P.L.L.C.

(57) ABSTRACT

A method and apparatus enables a base station to control the reverse link data rates of the mobile stations. Such control may be used to improve reverse link throughput, and such improvements may be balanced against fairness of service interests. Broadly, a radio base station (RBS) makes per-mobile station rate control decisions in each rate control interval based on each mobile station's desired rate and past reverse link throughput. These values may be used to compute a priority value for each mobile station, which values are then used to prioritize the mobile stations in rank order. Rate control decisions are made for the mobile stations in rank order based on their desired rates and remaining reverse link capacity. In one embodiment, the mobile stations provide path loss information to the RBS, and it computes each mobile station's desired rate as the mobile's achievable rate assuming it transmitted at maximum power.

54 Claims, 5 Drawing Sheets

U.S. PATENT DOCUMENTS

| | | | |
|---|---|---|---|
| 6,760,596 B1 * | 7/2004 | Fiorini et al. | 455/522 |
| 6,810,253 B2 * | 10/2004 | Lee et al. | 455/450 |
| 7,031,742 B2 * | 4/2006 | Chen et al. | 455/522 |
| 7,190,964 B2 * | 3/2007 | Damnjanovic et al. | 455/522 |
| 2002/0015388 A1 | 2/2002 | Ho-Kyu et al. | |

OTHER PUBLICATIONS

LG Electronics; Kim, et al.; Rate Control Mechanism for LGE's Reverse Link Framework Proposal for Revision D; Aug. 6, 2003; C30-2203-806-021; 9 pgs.

Nokia; Pi, et al.; Cdma2000 Rev.D Performance with 10ms 3 HARQ Transmission and Full Buffer Traffic; Aug. 6, 2003; C30-20030806-042; 9 pgs.

Khan, F. "System Performance of Lucent's HRPD REv. A RL Proposal." 3rd Generation Partnership Project 2 "3GPP2." C30-20030915-217, TSG-C WG3. Sep. 15, 2003.

Kwon, E. et al. "Description of Scheduling and Resource Allocation for Various Control Mechanisms Simulated by Samsung under HARQ Scenario." 3rd Generation Partnership Project 2 "3GPP2." C30-WG3-20030812-071. Aug. 12, 2003.

Vrzic, S. et al. "Full Buffer Simulation Results for Semi-distributed Scheduling, with 10ms Frame and 3 Transmissions." 3rd Generation Partnership Project 2 "3GPP2." C30-2003-08-06-052R1, 3GPP2 TSG-C. Aug. 6, 2003.

* cited by examiner

US 7,554,954 B2

PER USER RATE CONTROL FOR THE REVERSE LINK IN CDMA NETWORKS

RELATED APPLICATIONS

This application claims priority under 35 U.S.C. § 119(e) from the following provisional application: Application Ser. No. 60/494,661 filed on Aug. 12, 2003. That application is incorporated in its entirety by reference herein.

BACKGROUND OF THE INVENTION

The present invention generally relates to wireless communication networks, and particularly relates to reverse link rate control in such networks.

Interference limits reverse link capacity in Code Division Multiple Access (CDMA) networks, meaning that the number of mobile stations simultaneously transmitting to a given network base station or stations is limited by the resultant overall interference at the base station receivers. CDMA networks typically employ closed loop power control on the reverse link, wherein the network base stations adjust the transmit power of each mobile station up or down as needed to receive the mobile station's transmitted signals at a targeted signal quality. Such control prevents any individual mobile station from transmitting at a higher-than-necessary power and thus helps to reduce that mobile station's contribution to the overall interference.

By working to reduce the interference caused by each mobile station, the network more efficiently uses its reverse link capacity, which is a measure of the overall loading that can be supported by the base station. For example, reducing the interference contribution of each mobile station increases the number of simultaneous users that can be supported at a target reverse link loading, and/or allows one or more of those users to operate at higher reverse link data rates than otherwise could be permitted. That latter benefit touches on the point that higher data rates require higher target received signal qualities and thus require greater mobile station transmit power than do lower data rates under the same radio conditions.

The relationship between data rates and required transmit power plays into the evolving wireless network standards that define multiple reverse link data rates, thereby allowing base stations to control overall reverse link loading based at least in part on controlling the assigned reverse link data rates of individual mobile stations. For example, if it is desirable to support a greater number of simultaneous users, some or all of the users could be forced to lower data rates to thereby reduce the individual interference contribution of those users. Similarly, the base station may schedule which users transmit on the reverse link in each of a succession of scheduling intervals. By limiting the number of simultaneous users in each interval, overall interference is kept within tolerable levels. The forthcoming "Release D" of the IS-2000 standard exemplifies this type of rate-adjustable reverse link interface, but other network standards define at least broadly similar rate adjustable reverse link channels that can be managed by the network.

SUMMARY OF THE INVENTION

The present invention comprises a method and apparatus to control the reverse link rates of one or more mobile stations operating under control of a wireless communication network. While not so limited, the present invention has particular applicability to the reverse link in Code Division Multiple Access Networks, such as cdma2000 and Wideband CDMA (WCDMA) networks.

In an exemplary embodiment, mobile stations periodically indicate whether they wish to increase their reverse link data rates, and the network determines priority values for the mobile stations in each of a succession of scheduling intervals based on these indications and on the reverse link throughputs of the mobile stations, e.g., a running value maintained at the base station to track each mobile station's reverse link throughput. The priority values so determined can be scaled or otherwise adjusted based on a desired fairness of service, or according to another service objective. As an alternative or supplement to the rate indications, the network can determine the highest achievable rate for a mobile station, and use that value as its desired rate in the scheduling calculations.

Thus, an exemplary method of reverse link rate control at a wireless communication network base station comprises receiving a rate indication from each of one or more mobile stations being supported by the base station, wherein the rate indication from the mobile station indicates whether the mobile station desires to increase its reverse link data rate, calculating a priority value for each of the one or more mobile stations that is proportional to a higher data rate if the rate indication indicates that a higher data rate is desired by the mobile station or otherwise is proportional to a current rate of the mobile station, and that is inversely proportional to a reverse link throughput of the mobile station, ranking the one or more mobile stations based on their priority values, and generating reverse link rate control decisions for the mobile stations based on their ranking and available reverse link capacity. The rate indications may comprise load status bits from each mobile station indicating whether the mobile station desires to increase its reverse link rate, and the base station may calculate reverse link capacity based on assuming a low or minimum reverse link rate for each mobile station.

In another exemplary embodiment, a method of reverse link rate control at a wireless communication network base station based on the achievable rates comprises determining an achievable data rate for each of a plurality of mobile stations based on a reverse link path loss of the mobile station and a maximum transmit power of the mobile station, calculating a priority value for each mobile station based on the achievable rate determined for the mobile station, and generating reverse link data rate control decisions for one or more of the plurality of mobile stations based on their corresponding priority values. Such rate control decisions may be part of reverse link scheduling wherein the number of mobile stations permitted to transmit on the reverse link in each rate control interval is restricted, or may be part of dedicated rate control, wherein the particular mobile stations granted higher reverse link rates is changed from interval to interval to maintain throughput, to achieve service fairness, or to achieve some other objective.

The base station may determine an achievable data rate for each of a plurality of mobile stations based on a reverse link path loss of the mobile station and a maximum transmit power of the mobile station. For example, the base station can be configured to calculate the achievable rate according to Shannon's Capacity Theorem based on a Signal-to-Interference-and-Noise Ratio (SINR) that could be achieved by the mobile station given its maximum transmit power and its reverse link path loss. In support of such calculations, the base station may maintain an estimate of its total noise plus interference.

Regardless, the base station may be configured to generate the reverse link data rate control decisions for one or more of the plurality of mobile stations based on their corresponding priority values by ranking the mobile stations according to their achievable rates, and selecting one or more of the mobile stations in rank order for scheduled use of the reverse link in a next scheduling interval. Further, the base station may limit the number of mobile stations selected based on a reverse link target loading. Regardless, the base station may rank the mobile stations according to their achievable rates, select one or more of the mobile stations in rank order, and grant reverse link rate increases to the selected mobile stations, or schedule the selected mobile stations for use of the reverse link in a next interval.

Of course, the present invention is not limited by these exemplary details. Moreover, those skilled in the art will recognize additional features and advantages provided by the present invention upon reading the following discussion, and upon viewing the accompanying figures.

DETAILED DESCRIPTION OF THE INVENTION

Figure 1:
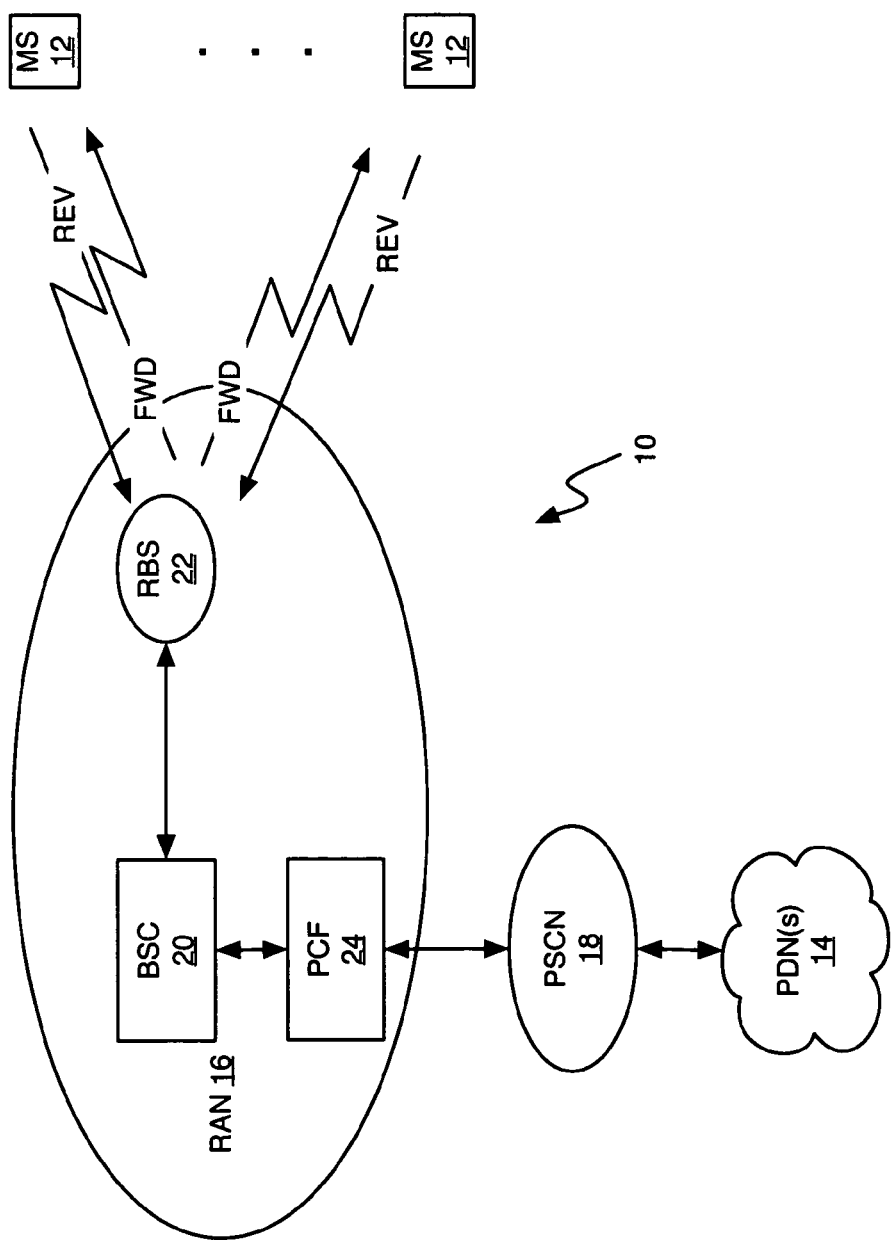
FIG. 1 is a diagram of a wireless communication network according to one or more embodiments of the present invention.

FIG. 1 is a diagram of an exemplary wireless communication network 10 according to one or more embodiments of the present invention. Network 10 may be a cdma2000 network configured according to IS-2000 standards but the present invention is applicable to networks configured according to other standards, such as Wideband CDMA (WCDMA). Regardless, as illustrated, network 10 communicatively couples a plurality of mobile stations 12 to one or more Public Data Networks (PDNs) 14, such as the Internet.

Network 10 comprises a Radio Access Network (RAN) 16 that is coupled to the PDN(s) 14 through a Packet Switched Core Network (PSCN) 18. RAN 16 comprises at least one Base Station (BS) that includes a Base Station Controller 20 and one or more associated Radio Base Stations (RBSs) 22. BSC 20 may include packet control interface circuits to communicate with PSCN 18, or may couple to PSCN 18 through a Packet Control Function 24. While only one BSC 20 and RBS 22 are illustrated for clarity, it should be understood that RAN 16 may include a plurality of BSCs 20, each controlling one or more RBSs 22. Further, network 10 may include additional entities not illustrated, such as a Circuit Switched Core Network (CSCN) to communicatively couple RAN 16 to the Public Switched Telephone Network (PSTN).

RBS 22 transmits to the mobile stations 12 on a forward link and receives transmissions from the mobile stations on a reverse link. In actuality, these links each comprise one or more dedicated (mobile-specific) communication channels, and one or more common or shared communication channels. The different communication channels are defined by code division multiplexing, and/or by time division multiplexing, as is well understood in the art. In particular, a group of exemplary mobile stations 12 transmit data back to network 10 via dedicated reverse link traffic channels that are received and decoded by RBS 22. Each mobile station 12 may have one or more traffic channels, and the data rates of such channels may be adjusted upward or downward by RBS 22 according to the needs of each particular mobile station 12, and according to prevailing conditions, e.g., base station loading.

As was noted earlier herein, the reverse link from the mobile stations 12 to the RBS 22 is interference limited. An exemplary RBS 22 may impose reverse link power control on each mobile station 12 to maintain its reverse link transmit power at whatever level is needed to maintain the received signal(s) from the mobile station 12 substantially at a received signal target quality. With or without such power control, RBS 22 can effect control of the overall reverse link loading on it by controlling how many and which ones of the mobile stations 12 are permitted to transmit simultaneously on the reverse link at any given time, or by adjusting the reverse link data rates of one or more of them up or down, or by some combination of these two approaches.

Figure 2:
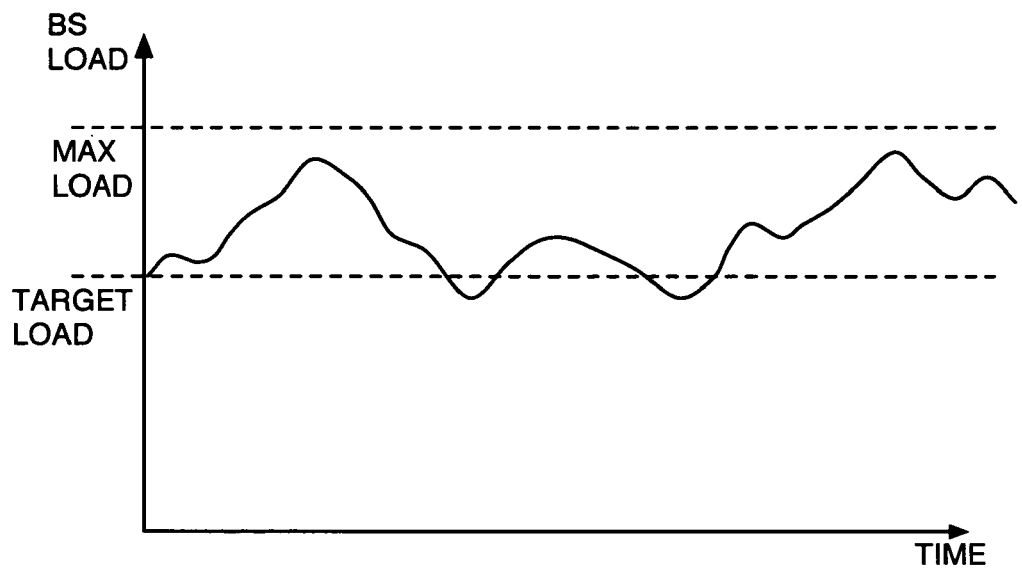
FIG. 2 is a diagram of typical reverse link loading over a selected time period.

FIG. 2 illustrates the dynamic nature of reverse link loading, and shows that overall reverse link rate control by RBS 22 may be based on maintaining reverse link loading at or around a target loading level. Typically, the target loading level is set as close as practical to a maximum loading level that corresponds to some defined "outage" probability. For example, the maximum loading level may correspond to a one-percent outage probability, meaning that, statistically, there is a one-percent chance of loading-induced system outage at the maximum loading level. The more tightly RBS 22 can control its loading, i.e., the more it can reduce loading variations, the more closely it can set its targeted loading to the maximum loading level, which allows greater reverse link capacity utilization.

Thus, by generating reverse link rate control decisions for one or more of the mobile stations on an ongoing basis, e.g., during each of a succession of rate control intervals, RBS 22 can control the overall reverse link loading caused by the mobile stations 12. According to the present invention, an exemplary rate control method provides effective loading control, and may provide improved throughput on the reverse link, i.e., it may provide an increase in the aggregate reverse link throughput of the plurality of mobile stations 12 being served on the reverse link by RBS 22. Of course, rate control according to one or more embodiments of the present invention may be configured to strike a desired balance between maximizing reverse link throughput and providing overall fairness of service.

Figure 3:
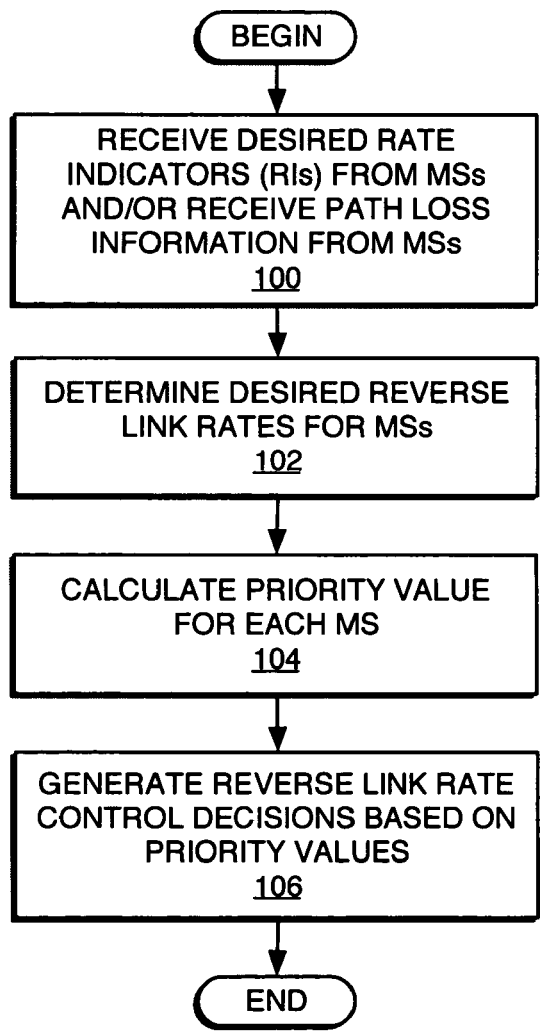
FIG. 3 is a diagram of broad, exemplary reverse link rate control processing.

FIG. 3 illustrates exemplary RBS processing logic according to a broad embodiment of the present invention. As with the additional processing logic illustrated later herein, it should be understood that RBS 22 may comprise one or more microprocessor-based circuits, programmable logic circuits, and other circuit elements that may be used individually or in any combination to implement the present invention. Thus, the present invention can be implemented in hardware, software, or both. In an exemplary embodiment, the RBS components of the present invention comprise, at least in part, a computer program stored in memory or other computer-readable medium in RBS 22.

In any case, exemplary processing is carried out as needed or on a regularly scheduled basis. For example, RBS 22 can be configured to carry out the illustrated processing on a periodic basis, such as every reverse link transmit frame. By way of non-limiting example, the forthcoming Release D of the IS-2000 standards defines a rate-controlled Reverse Link Packet Data Channel (R-PDCH) that has a frame timing of 10 ms. As applied to such channel types, then, RBS 22 conducts exemplary rate control operations every 10 ms. Of course, essentially any rate control interval can be adopted but it should be understood that longer control intervals can comprise the responsiveness of reverse link load control, and that such lag can result in a compromised ability to control rapid fluctuations in reverse link loading.

Thus, the illustrated logic may represent a set of logical operations carried out per rate control interval, which may be once per frame. Processing begins with RBS 22 receiving desired rate indicators from mobile stations 12 and/or receiving path loss information from them (Step 100). In some embodiments, RBS 22 may receive desired rate indicators from some mobile stations 12, and may receive path loss information from others. Either way, RBS 22 uses the received information to determine reverse link data rate desired by each mobile station 12 for a next rate control interval (Step 102).

Then, RBS 22 uses the desired rates to calculate a "scheduling" value for each mobile station 12 that will be used to prioritize the mobile stations 12 regarding the RBS's rate control decisions (Step 104). Once the priority values are calculated, RBS 22 prioritizes the mobile stations 12, e.g., ranks them according to priority values, and generates corresponding rate control decisions for the corresponding rate control interval (Step 106). Such decisions may be generated as incremental up, down, or hold indicators, such as used in Dedicated Rate Control (DRC) methods, wherein the reverse link data rates of individual mobile stations 12 are held or incrementally moved up or down in each rate control interval. Such decisions also may be generated as specific rate control assignments, i.e., rate assignments rather than incremental rate commands are sent to some or all of the mobile stations 12.

Figure 4:
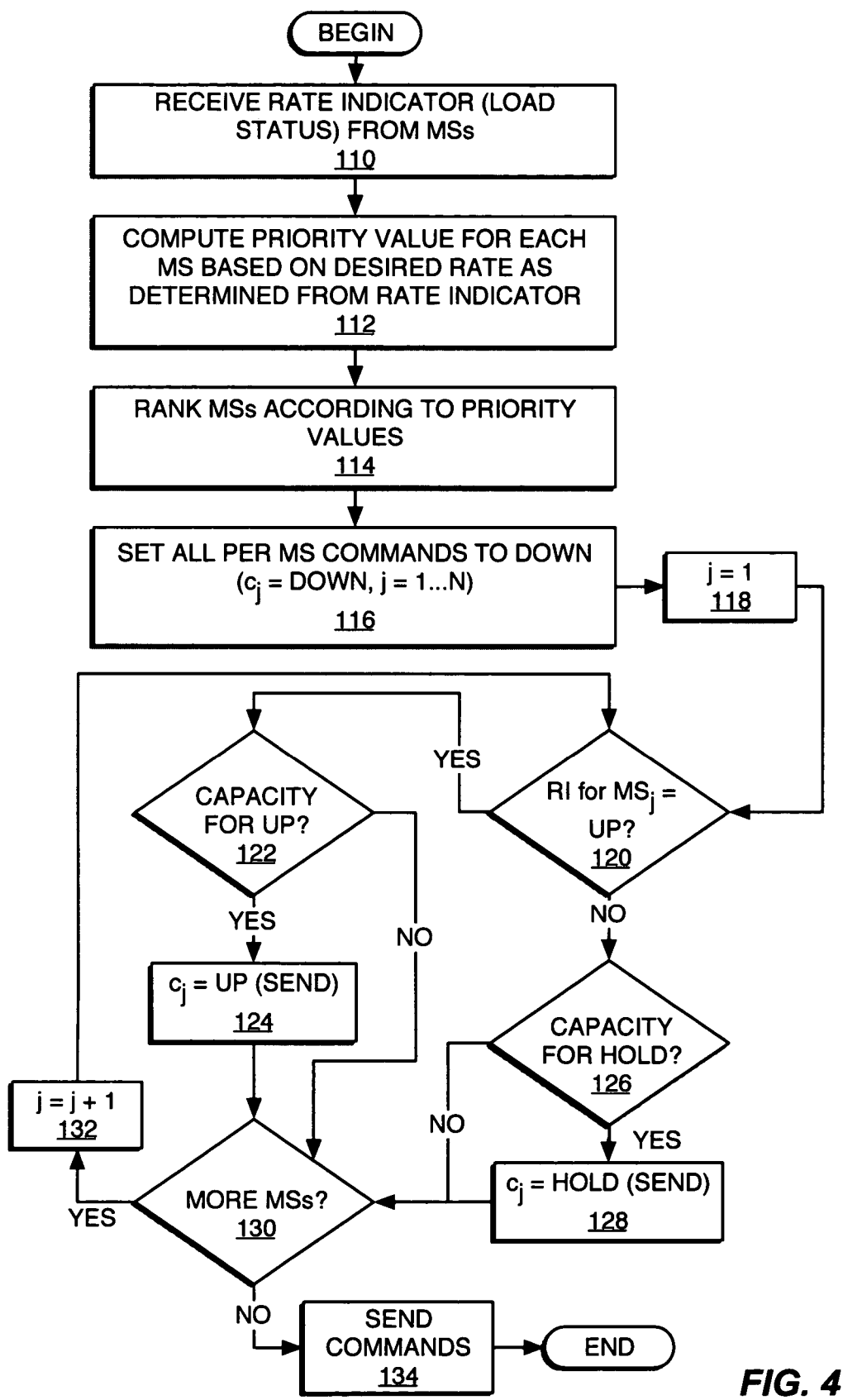
FIG. 4 is a diagram of exemplary reverse link rate control based on receiving reverse link rate indicators from mobile stations.

FIG. 4 illustrates exemplary details regarding the use of desired rate indicators from the mobile stations 12. Each mobile station 12 in a given plurality of "N" mobile stations is configured periodically to transmit a rate indicator, e.g., a load status bit, that indicates whether it wishes to go up in rate. In a given rate control interval, the RBS 22 uses the received indicator from each mobile station 12 (Step 110) to calculate a priority value for that mobile station to be used in that interval or, more preferably, to be used in a next interval (Step 112). In an exemplary embodiment, rate control decisions generated in interval "n" are carried out in the next interval "n+1," but other approaches can be adopted as needed or desired.

In an exemplary embodiment, the priority value, i.e., the rate control priority, for each mobile station 12 is computed by tracking the past reverse link throughput $r(n)$ of each mobile station as, $$r(n+1)=\alpha r(n)+(1-\alpha)d(n), \quad (1)$$

where $0<\alpha<1$ is a smoothing factor, and where $d(n)$ denotes the mobile station's transmission rate for period n.

Then, letting $d_+(n)$ denote the next rate level above $d(n)$ if $d(n)$ is less than the maximum reverse link rate, the priority value, $P_j$, for the jth mobile station 12 is given by, $$\text{If } (d(n) < \text{max rate and mobile status} = \text{UP}) \quad (2)$$
$$\text{then } \{P_j = \phi d_+(n)/r(n) + (1-\phi)d_+(n)\}$$
$$\text{else } \{P_j = \phi d(n)/r(n) + (1-\phi)d(n)\}.$$

Where $0<\phi<1$ is a fairness factor that may be used to control fairness versus throughput prioritization.

RBS 22 ranks the mobile stations 12 according to their priority values (Step 114) and sets the incremental rate control command, $c_j$, to "down" for all mobile stations j=1 . . . N (Step 116). That is, the default rate control command for all mobile stations 12 of interest with respect to the ongoing rate control operations is set to down. The index value j is set to 1 corresponding to the highest priority mobile station (Step 118). RBS 22 checks whether the rate indicator (RI) for jth mobile station 12 indicated that jth mobile station 12 desired a higher rate (Step 120) and, if so, it checks whether there is sufficient reverse link capacity to allow the increase (Step 122). If so, RBS 22 changes the rate control command, $c_j$, from "down" to "up" (Step 124). RBS 22 may transmit the command to jth mobile station 12 at that time, or may defer transmission until later.

If the reverse link had insufficient capacity to permit the rate increase, RBS 22 does not set the rate command $c_j$ to up. Also, if the rate indicator for jth mobile station 12 did not indicate that it desired a rate increase (Step 120), RBS 22 checks whether sufficient reverse link capacity exists to permit jth mobile station 12 to hold its current rate (Step 126). If so, RBS 22 changes the rate command $c_j$ from down to hold (Step 128). As above, RBS 22 may send the rate command $c_j$ at that time, or may defer transmission until later.

After such processing is complete, RBS 22 determines whether there are additional mobile stations 12 (Step 130) and, if so, increments index j to point to the next jth mobile station 12 in rank order (Step 132) and selectively repeats the above rate control method (Steps 120-128). If the rate control commands for each jth mobile station 12 were not sent as part of such operations, the RBS 22 can transmit all such commands at the end of rate control processing (Step 134).

According to the above exemplary logic, RBS 22 implements a priority function in which it determines a priority value for each mobile station 12 that is based on its desired rate and its reverse link throughput, which may be a filtered value of past throughput. RBS 22 sets the planned rate control commands for all mobile stations 12 to down, and then generates per-mobile DRC decisions based on putting mobile stations 12 in rank order according to their priority values and permitting rate increments or rate holds for each mobile station 12 in turn, for so long as reverse link capacity is available. Once the scheduled rates for the next interval are such that the reverse link capacity is exhausted relative to targeted loading, RBS 22 leaves the rate control commands for any remaining mobile stations set to down, meaning that they will be commanded to decrease their reverse link rates in the next rate control interval. Of course, if a mobile station 12 already is at a minimum permissible or minimum defined rate, it may hold that rate even if it receives a down command. It should be noted that per-mobile station rate control as described immediately above may be carried out in the context of one or more defined sets of available reverse link rates, e.g., 14.4 kbps, 28.8 kbps, 57.6 kbps, 115.2 kbps, etc. In this context, an exemplary rate change may comprise a step up to the next higher rate or a step down to the next lower rate, or a fallback to some minimum defined rate. Thus, by way of non-limiting example, assume the jth mobile station's current reverse link data rate is 28.8 kbps, its effective reverse link throughput currently is 18 kbps, and its rate indication indicated that it desires a rate increase for the next rate control interval. The calculation of its priority value, Pj, is thus given as $Pj=\phi(57.6 \text{ kpbs})/(18 \text{ kbps})+(1-\phi)(57.6 \text{ kbps})$.

Note that if the rate indication indicated that no rate increase was desired, then $Pj=\phi(28.8 \text{ kpbs})/(18 \text{ kbps})+(1-\phi)(28.8 \text{ kbps})$.

From the above example, one sees that exemplary priority values are proportional to the mobile station's desired rate and inversely proportional to its reverse link throughput. Note, too, that for the same throughput values and current data rates, one mobile station will have a higher priority value than another if it desires a higher reverse link rate and the other does not. Of course, it should be understood that specific rates may be commanded on a per mobile station basis, particularly in the following section dealing with the calculation of each mobile station's desired rate as its achievable rate according to Shannon's Capacity Theorem. In those circumstances, the priority value calculations uses the achievable rate in place of d(n) or d+(n) in Eq. (2) above.

Figure 5:
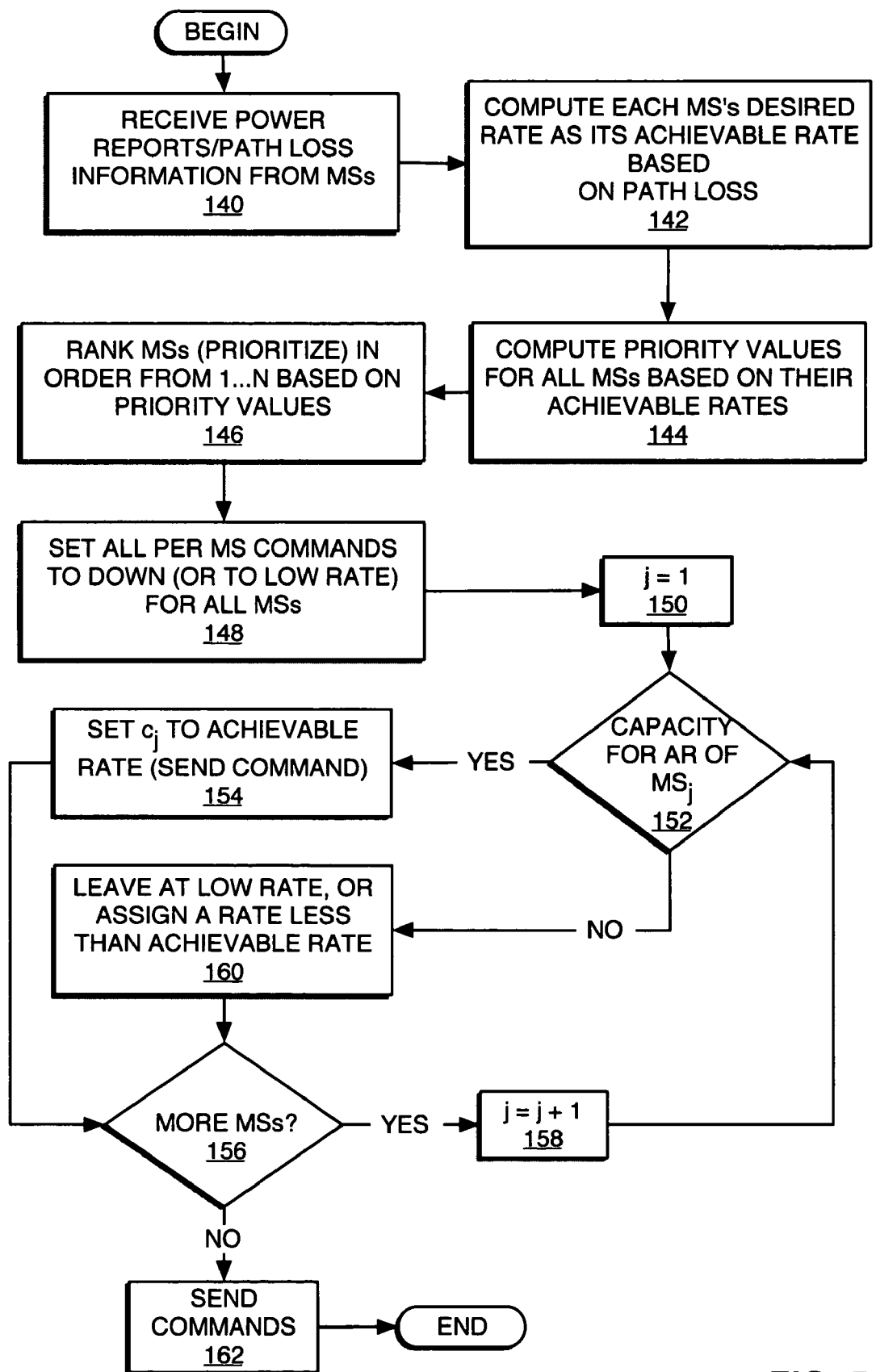
FIG. 5 is a diagram of exemplary reverse link rate control based on setting desired rates of mobile stations to their achievable rates as computed from Shannon's Capacity Theorem.

FIG. 5 illustrates another exemplary embodiment of the present invention that may be used with the above DRC method of rate control, or used in full or partial user scheduling wherein, in each rate control interval, selected mobile stations 12 transmit at assigned rates, and the remaining mobile stations 12 either transmit at or below a default rate, e.g., an autonomous data rate of 9.6 kbps, or do not transmit at all. Rather than set the desired reverse link rate for each mobile station 12 based on rate indicator feedback, RBS 22 uses Shannon's Capacity Theorem to determine each mobile station's achievable reverse link rate and sets the desired rate to that achievable rate.

Again, for a given rate control interval, processing begins with RBS 22 receiving path loss feedback from each mobile station 12 in a given plurality of mobile stations (Step 140). Such information may comprise each mobile station 12 periodically transmitting a power report to RBS 22. For example, each mobile station 12 periodically may transmit $x_f(n)$ to RBS 22, which is an appropriately filtered estimate of received power at the mobile station 12 for period n. In turn, RBS 22 can track the average transmission power for the same mobile station 12, e.g., track the forward link traffic channel power used to transmit to that mobile station 12 in the same period. The tracked power at the RBS 22, which is denoted as $p_f(n)$ can be used in conjunction with the value $x_f(n)$ received from the mobile station 12 to estimate forward link path loss as, $g(n)=x_f(n)/p_f(n)$.  (3)

The RBS 22 may then determine the reverse link path loss for the mobile station 12. For example, it may be configured to assume that the forward and reverse link paths are symmetrical, in which case the RBS 22 sets the reverse link path loss for the mobile station 12 to the same value as that just calculated for the forward link. Of course, RBS 22 may be configured with a non-unity scaling factor that relates reverse link gain to forward link gain. In any case, however, the received power information fed back from the mobile stations 12 enables the RBS 22 to make informed reverse link path loss estimates for those mobile stations 12.

With path loss information thus available at RBS 22, it calculates the achievable data rate for each mobile station 12 (Step 142). An exemplary calculation of achievable rate is based on the reverse link path loss of the mobile station 12, and according to Shannon's Capacity Theorem is expressed as, $$d(n) = B\log_2\left(1 + \frac{x_r(n)}{I(n)}\right) = B\log_2\left(1 + \frac{p_{max}x_f(n)}{I(n)p_f(n)}\right), \quad (4)$$

where d(n) denotes the desired rate as above, and $x_r(n)$ denotes the power that the mobile station's signal would be received at if the mobile station 12 were to transmit at its maximum power, $p_{max}$, given the calculated reverse link path loss g(n), and where I(n) represents the total interference plus noise received at RBS 22. Generally, RBS 22 knows the maximum power of each mobile station 12, e.g., 200 mW, and can be configured to store such information. However, the mobile stations 12 can be configured to provide maximum transmit power information to RBS 22, and such information can express absolute power limits, or can express maximum power for the given conditions, i.e., how much power is available given headroom requirements, etc.

In support of the above achievable rate calculations, RBS 22 may track or otherwise maintain an estimate of its total interference plus noise, I(n), so that RBS 22 can compute the SINR of the mobile station's signal at the RBS 22 that would result from the mobile station 22 transmitting at maximum power. RBS 22 may maintain the estimate of I(n) as a filtered value that is averaged or exponentially weighted over a number of rate control intervals.

In any case, with the desired rates set to the calculated achievable rates, RBS 22 computes a priority value for each mobile station 12 (Step 144). Such calculation may be performed based on the mobile station's reverse link throughput according to Eq. (1) above. Thus, an exemplary calculation of the priority value $P_j$ for the jth mobile station may be expressed as $P_j=d(n)/r(n)$, where d(n) is set to the achievable rate of jth mobile station 12.

As before, RBS 22 ranks the N mobile stations 12 according to the priority values (Step 146), and then sets the rate command $c_j$ for each jth mobile station 12 to a low or default value (Step 148). Then, RBS 22 indexes j to the first, highest priority mobile station 12 (Step 150), and evaluates whether the reverse link has the capacity to grant the jth mobile station its desired rate (Step 152). If so, RBS 22 sets the rate command cj to the desired rate and, optionally, transmits the command to the jth mobile station 12 (Step 154). If there are more mobile stations 12 to evaluate (Step 156), RBS 22 increments index j and repeats. Note that if there were insufficient capacity to grant the desired rate (Step 152), RBS 22 may be configured to leave the jth mobile station at its current rate, grant a fall back rate, e.g., a next lowest rate, or may drop it back to some lower rate (Step 160).

Once RBS 22 has generated rate control decisions for all mobile stations 12 in the plurality of N mobile stations 12 subject to rate control during the interval of interest, it may send the rate control commands (Step 162), if such commands were not sent as part of the per-mobile rate control decision processing just explained.

Figure 6:
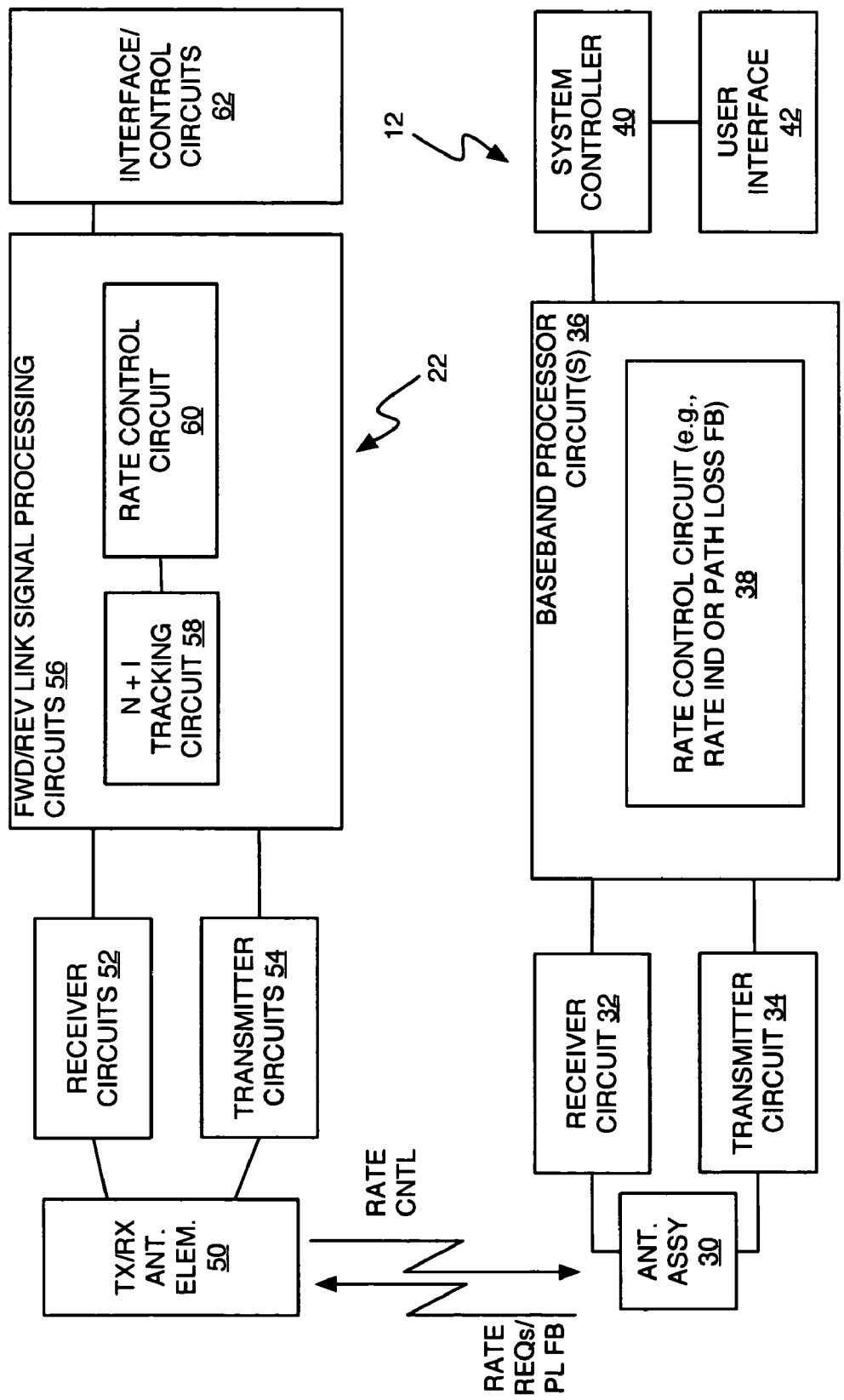
FIG. 6 is a diagram of exemplary mobile station and radio base station functional configurations.

By way of non-limiting examples, FIG. 6 illustrates embodiments for an exemplary RBS 22 and for an exemplary mobile station 12. Mobile station 12 comprises an antenna assembly 30, a receiver circuit 32, a transmitter circuit 34, baseband processor circuit(s) 36, including a rate control circuit 38, and a system controller 40 (e.g., microcontroller) and an associated user interface 42 (e.g., keypad, display, speakers, etc.). RBS 22 comprises transmit/receive antenna elements 50, pooled receiver circuits 52, pooled transmitter circuits 54, forward/reverse link signal processing circuits 56, including tracking circuit 58 and rate control circuit 60, and interface/control circuits 62.

In mobile station 12, rate control circuit 38 may be configured as part of a baseband signal processor, or as part of another microprocessor or other logic-based circuit in mobile station 12. In an exemplary embodiment, rate control circuit 38 generates periodic rate control requests in the form of rate indicators that indicate whether the mobile station wants to increase its reverse link rate. Additionally, or alternatively, the rate control circuit 38 may be configured to support RBS-based reverse link rate control by providing power reports or other path loss information described above on a periodic basis. Thus, rate control circuit 38 may include or be associated with a power measurement circuit that provides received power determination and filtering functions.

Complementing such functionality, the rate control circuit 60 at RBS 22 may be configured to carry out any or all of the above exemplary rate control processing methods. In one embodiment, the RBS 22 receives desired rate indicators from the mobile stations 12 via the reverse link, and rate control circuit 60 processes them to determine priority values to be used in ranking the mobile stations 12 and generating the appropriate rate control decisions. Alternatively, or additionally, rate control circuit 60 may be configured to set each mobile station's desired rate to a calculated achievable rate as described above. As such, RBS 22 may be configured to maintain an estimate of received noise plus interference for RBS 22, such that it can compute the SINR values on which the achievable rates are computed according to Shannon's Capacity Theorem.

Of course, the present invention is not limited by these exemplary details, nor by the illustrated base and mobile station architectures. Indeed, the present invention is limited only by the following claims and the reasonable equivalents thereof.

What is claimed is:

1. A method of reverse link rate control at a wireless communication network base station comprising:
    receiving a rate indication from each of one or more mobile stations being supported by the base station, wherein the rate indication from the mobile station indicates whether the mobile station desires to increase its reverse link data rate;
    calculating a priority value for each of the one or more mobile stations that is proportional to a higher data rate if the rate indication indicates that a higher data rate is desired by the mobile station or otherwise is proportional to a current rate of the mobile station, and that is inversely proportional to a reverse link throughput of the mobile station;
    ranking the one or more mobile stations based on their priority values; and
    generating reverse link rate control decisions for the mobile stations based on their ranking and available reverse link capacity.

2. The method of claim 1, further comprising performing the method of claim 1 in each of a succession of ongoing rate control intervals.

3. The method of claim 2, further comprising using the rate indications received in a current rate control interval to generate rate control decisions for a subsequent rate control interval.

4. The method of claim 1, wherein generating reverse link rate control decisions for the mobile stations based on their ranking and available reverse link capacity comprises granting reverse link rate increases to the mobile stations as desired in rank order conditioned on the availability of sufficient reverse link capacity for each successive grant.

5. The method of claim 1, wherein calculating a priority value for each of the one or more mobile stations that is proportional to a higher data rate if the rate indication indicates that a higher data rate is desired by the mobile station or otherwise is proportional to a current rate of the mobile station, and that is inversely proportional to a reverse link throughput value of the mobile station further comprises including a fairness term in the calculation of each priority value.

6. The method of claim 1, further comprising maintaining the reverse link throughput values for the one or more mobile stations based on tracking the reverse link throughput of each mobile station.

7. The method of claim 6, wherein maintaining the reverse link throughput values for the one or more mobile stations based on tracking the reverse link throughput of each mobile station comprises maintaining filtered throughput estimates for the one or more mobile stations.

8. The method of claim 1, wherein generating reverse link rate control decisions for the mobile stations based on their ranking and available reverse link capacity comprises:
    assuming a down command as a default rate control command for all of the one or more mobile stations;
    estimating a capacity value assuming that each mobile station will decrease its reverse link rate in a next rate control interval, or at least hold its rate at a minimum defined rate; and
    selectively setting the rate control command for each mobile station taken in rank order to other than the down command by:
        if the mobile station desires a rate increase, commanding a rate increase if the capacity value is sufficient to support that rate increase or, if not, commanding a rate hold if the capacity value is sufficient to support a current rate of the mobile station; and
        adjusting the capacity value if either a rate increase or a rate hold was commanded for the mobile station.

9. The method of claim 1, wherein generating reverse link rate control decisions for the mobile stations based on their ranking and available reverse link capacity comprises:
    estimating a reverse link capacity value; and
    evaluating the mobile stations in rank order and granting rate increases to each mobile station that desires a rate increase conditioned on whether the reverse link capacity value as adjusted to account for any rate increases granted to higher ranking mobile stations is sufficient to support the contemplated rate increase.

10. The method of claim 9, further comprising, for a given mobile station being evaluated in rank order, granting a rate hold as an alternative to granting a rate increase if the reverse link capacity value is not sufficient to support the contemplated rate increase.

11. A base station for use in a wireless communication network comprising:
    transceiver circuits to send signals to a plurality of mobile stations on a forward link and to receive signals from the mobile stations on a reverse link;
    processing logic to control the transceiver circuits, said processing logic including a rate control circuit configured to generate reverse link rate control decisions for the mobile stations by:
        receiving a rate indication from each of one or more mobile stations being supported by the base station, wherein the rate indication from mobile station indicates whether the mobile station desires to increase its reverse link data rate;

calculating a priority value for each of the one or more mobile stations that is proportional to a higher data rate if the rate indication indicates that a higher data rate is desired by the mobile station or otherwise is proportional to a current rate of the mobile station, and that is inversely proportional to a reverse link throughput of the mobile station;

ranking the one or more mobile stations based on their priority values; and generating reverse link rate control decisions for the mobile stations based on their ranking and available reverse link capacity.

12. The base station of claim 11, wherein the base station is configured to generate new rate control decision for the one or more mobile stations in each of a succession of ongoing rate control intervals.

13. The base station of claim 12, wherein the rate control circuit is configured to use the rate indications received in a current rate control interval to generate the rate control decisions for a subsequent rate control interval.

14. The base station of claim 11, wherein the rate control circuit is configured to generate reverse link rate control decisions for the mobile stations based on their ranking and available reverse link capacity by granting reverse link rate increases to the mobile stations as desired in rank order conditioned on the availability of sufficient reverse link capacity for each successive grant.

15. The base station of claim 11, wherein the rate control circuit is configured to calculate the priority value for each of the one or more mobile stations further based on a fairness factor.

16. The base station of claim 11, wherein the rate control circuit is configured to maintain the reverse link throughput values for the one or more mobile stations by tracking the reverse link throughput of each mobile station.

17. The base station of claim 16, wherein the rate control circuit is configured to track the reverse link throughput of each mobile station by maintaining filtered throughput estimates for the one or more mobile stations.

18. The base station of claim 11, wherein the rate control circuit generates reverse link rate control decisions for the mobile stations based on their ranking and available reverse link capacity by:

assuming a down command as a default rate control command for all of the one or more mobile stations;

estimating a capacity value assuming that each mobile station will decrease its reverse link rate in a next rate control interval, or at least hold its rate at a minimum defined rate; and selectively setting the rate control command for each mobile station taken in rank order to other than the down command by:

if the mobile station desires a rate increase, commanding a rate increase if the capacity value is sufficient to support that rate increase or, if not, commanding a rate hold if the capacity value is sufficient to support a current rate of the mobile station; and adjusting the capacity value if either a rate increase or a rate hold was commanded for the mobile station.

19. The base station of claim 11, wherein the rate control circuit generates reverse link rate control decisions for the mobile stations based on their ranking and available reverse link capacity by:

estimating a reverse link capacity value; and evaluating the mobile stations in rank order and granting rate increases to each mobile station that desires a rate increase conditioned on whether the reverse link capacity value as adjusted to account for any rate increases granted to higher ranking mobile stations is sufficient to support the contemplated rate increase.

20. The base station of claim 19, wherein, for a given mobile station being evaluated in rank order, the rate control circuit is configured to grant a rate hold as an alternative to granting a rate increase if the reverse link capacity value is not sufficient to support the contemplated rate increase.

21. A method of reverse link rate control at a wireless communication network base station comprising:

determining a desired reverse link rate for each mobile station in a plurality of mobile stations supported by the base station based on a reverse link path loss and a maximum transmit power of the mobile station, or based on a rate indication from the mobile station;

calculating a priority value for each mobile station based on the desired rate and an average throughput of the mobile station; and generating reverse link data rate control decisions for one or more of the plurality of mobile stations based on their corresponding priority values.

22. The method of claim 21, wherein determining a desired reverse link rate for each mobile station in a plurality of mobile stations supported by the base station based on a rate indication from the mobile station comprises periodically receiving a rate indicator that selectively indicates whether the mobile station wishes to increase its reverse link data rate and setting the desired rate to a next higher defined data rate if the rate indicator indicates that a higher rate is desired unless a current rate of the mobile station is at a maximum.

23. The method of claim 22, wherein calculating a priority value for each mobile station based on the desired rate and an average throughput of the mobile station comprises calculating the priority value such that it varies in proportion to the desired rate and varies in inverse proportion to the average throughput.

24. The method of claim 23, wherein periodically receiving a rate indicator that selectively indicates whether the mobile station wishes to increase its reverse link data rate comprises receiving a new rate indicator per reverse link transmit frame, and wherein calculating a priority value for each mobile station based on the desired rate and an average throughput of the mobile station comprises calculating a new priority value per reverse link transmit frame.

25. The method of claim 21, wherein determining a desired reverse link rate for each mobile station in a plurality of mobile stations supported by the base station based on a reverse link path loss and a maximum transmit power of the mobile station comprises setting the desired reverse link rate to an achievable reverse link rate calculated from the maximum transmit power and the reverse link path loss.

26. The method of claim 21, wherein determining a desired reverse link rate for each mobile station in a plurality of mobile stations supported by the base station based on a reverse link path loss and a maximum transmit power of the mobile station comprises setting the desired reverse link rate to an achievable rate calculated according to Shannon's Capacity Theorem from the maximum transmit power, the reverse link path loss, and a base station estimate of total noise plus interference.

27. The method of claim 21, wherein determining a desired reverse link rate for each mobile station in a plurality of mobile stations supported by the base station based on a reverse link path loss and a maximum transmit power of the mobile station, or based on a rate indication from the mobile station comprises determining the desired reverse link rate as an achievable rate for the mobile station based on the reverse link path loss and the maximum transmit power.

28. The method of claim 27, wherein determining the desired reverse link rate as an achievable rate for the mobile station based on the reverse link path loss and the maximum transmit power comprises calculating a SINR for the mobile station based on an estimate of noise and interference at the base station, the reverse link path loss, and the maximum transmit power, and calculating the achievable rate based on Shannon's Capacity Theorem.

29. The method of claim 27, wherein calculating a priority value for each mobile station based on the desired rate and an average throughput of the mobile station comprises determining the priority value as a ratio of achievable rate to average throughput.

30. The method of claim 29, wherein generating reverse link data rate control decisions for one or more of the plurality of mobile stations based on their corresponding priority values comprises ranking mobile stations according to their priority values and making reverse link rate assignments for a next scheduling interval in rank order.

31. A method of reverse link rate control at a wireless communication network base station comprising:
   determining an achievable data rate for each of a plurality of mobile stations based on a reverse link path loss of the mobile station and a maximum transmit power of the mobile station;
   calculating a priority value for each mobile station based on the achievable rate determined for the mobile station; and
   generating reverse link data rate control decisions for one or more of the plurality of mobile stations based on their corresponding priority values.

32. The method of claim 31, further comprising receiving maximum transmit power information from one or more of the mobile stations.

33. The method of claim 32, further comprising using a default maximum power value as the maximum transmit power of one or more of the mobile stations.

34. The method of claim 31, wherein determining an achievable data rate for each of a plurality of mobile stations based on a reverse link path loss of the mobile station and a maximum transmit power of the mobile station comprises calculating the achievable rate according to Shannon's Capacity Theorem based on a SINR that could be achieved by the mobile station given its maximum transmit power and its reverse link path loss.

35. The method of claim 34, further comprising maintaining an estimate of total interference plus noise at the base station to be used in determining the SINR for the mobile station.

36. The method of claim 31, wherein calculating a priority value for each mobile station based on the achievable rate determined for the mobile station comprises calculating the priority value as a ratio of the achievable rate to an average reverse link throughput of the mobile station.

37. The method of claim 36, further comprising calculating the priority value further based on one of a fairness service objective or a maximum throughput service objective.

38. The method of claim 31, further comprising determining the reverse link path loss for each mobile station based on an indication of received forward link power at the mobile station and knowledge of corresponding transmitted forward link power at the base station.

39. The method of claim 38, wherein determining the reverse link path loss for each mobile station based on an indication of received forward link power at the mobile station and knowledge of corresponding transmitted forward link power at the base station comprises:
   receiving reports of received forward link power from the mobile station; and
   tracking forward link transmit power used to transmit to the mobile station.

40. The method of claim 39, wherein receiving reports of received forward link power from the mobile station comprises periodically receiving a report of average forward link traffic channel at the mobile station, and wherein tracking forward link transmit power used to transmit to the mobile station comprises maintaining an average of forward link traffic channel transmit power at the base station.

41. The method of claim 31, wherein generating reverse link data rate control decisions for one or more of the plurality of mobile stations based on their corresponding priority values comprises ranking the mobile stations according to their achievable rates, and selecting one or more of the mobile stations in rank order for scheduled use of the reverse link in a next scheduling interval.

42. The method of claim 41, further comprising limiting the number of mobile stations selected based on a reverse link target loading.

43. The method of claim 31, wherein generating reverse link data rate control decisions for one or more of the plurality of mobile stations based on their corresponding priority values comprises ranking the mobile stations according to their achievable rates, selecting one or more of the mobile stations in rank order, and granting reverse link rate increases to the selected mobile stations.

44. A base station for use in a wireless communication network comprising:
   transceiver circuits to send signals to a plurality of mobile stations on a forward link and to receive signals from the mobile stations on a reverse link;
   processing logic to control the transceiver circuits, said processing logic including a rate control circuit configured to generate reverse link rate control decisions for the mobile stations by:
      determining an achievable data rate for each of a plurality of mobile stations based on a reverse link path loss of the mobile station and a maximum transmit power of the mobile station;
      calculating a priority value for each mobile station based on the achievable rate determined for the mobile station; and
      generating reverse link data rate control decisions for one or more of the plurality of mobile stations based on their corresponding priority values.

45. The base station of claim 44, wherein the rate control circuit is configured to determine an achievable data rate for each of a plurality of mobile stations based on a reverse link path loss of the mobile station and a maximum transmit power of the mobile station by calculating the achievable rate according to Shannon's Capacity Theorem based on a SINR that could be achieved by the mobile station given its maximum transmit power and its reverse link path loss.

46. The base station of claim 45, wherein the rate control circuit is configured to maintain an estimate of total interference plus noise at the base station to be used in determining the SINR for the mobile station.

47. The base station of claim 44, wherein the rate control circuit is configured to calculate a priority value for each mobile station based on the achievable rate determined for the mobile station by calculating the priority value as a ratio of the achievable rate to an average reverse link throughput of the mobile station.

48. The base station of claim 47, wherein the rate control circuit is configured to calculate the priority value further based on one of a fairness service objective or a maximum throughput service objective.

49. The base station of claim 44, wherein the rate control circuit is configured to determine the reverse link path loss for each mobile station based on an indication of received forward link power at the mobile station and knowledge of corresponding transmitted forward link power at the base station.

50. The base station of claim 49, wherein the rate control circuit is configured to determine the reverse link path loss for each mobile station based on an indication of received forward link power at the mobile station and knowledge of corresponding transmitted forward link power at the base station by:
  receiving reports of received forward link power from the mobile station; and
  tracking forward link transmit power used to transmit to the mobile station.

51. The base station of claim 50, wherein the rate control circuit is configured to periodically receive a report of average forward link traffic channel at the mobile station, and track forward link transmit power used to transmit to the mobile station by maintaining an average of forward link traffic channel transmit power at the base station.

52. The base station of claim 44, wherein the rate control circuit is configured to generate reverse link data rate control decisions for one or more of the plurality of mobile stations based on their corresponding priority values by ranking the mobile stations according to their achievable rates, and selecting one or more of the mobile stations in rank order for scheduled use of the reverse link in a next scheduling interval.

53. The base station of claim 52, wherein the rate control circuit is configured to limit the number of mobile stations selected based on a reverse link target loading.

54. The base station of claim 44, wherein the rate control circuit is configured to generate reverse link data rate control decisions for one or more of the plurality of mobile stations based on their corresponding priority values by ranking the mobile stations according to their achievable rates, selecting one or more of the mobile stations in rank order, and granting reverse link rate increases to the selected mobile stations.

* * * * *

UNITED STATES PATENT AND TRADEMARK OFFICE
CERTIFICATE OF CORRECTION

PATENT NO. : 7,554,954 B2  
APPLICATION NO. : 10/731909  
DATED : June 30, 2009  
INVENTOR(S) : Hosein et al.

It is certified that error appears in the above-identified patent and that said Letters Patent is hereby corrected as shown below:

In Column 8, Line 47, delete "cj" and insert -- $c_j$ --, therefor.

Signed and Sealed this

Seventeenth Day of November, 2009

David J. Kappos  
*Director of the United States Patent and Trademark Office*